United States Patent
Diachina et al.

(10) Patent No.: US 9,769,287 B2
(45) Date of Patent: Sep. 19, 2017

(54) REDUCING PROTOCOL OVERHEAD IN SINGLE-BLOCK PACKET ACCESS PROCEDURES

(75) Inventors: John Diachina, Garner, NC (US); Andreas Bergström, Vikingstad (SE); Paul Schliwa-Bertling, Ljungsbro (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1178 days.

(21) Appl. No.: 13/051,825

(22) Filed: Mar. 18, 2011

(65) Prior Publication Data
US 2011/0274042 A1 Nov. 10, 2011

Related U.S. Application Data

(60) Provisional application No. 61/332,991, filed on May 10, 2010.

(51) Int. Cl.
| H04W 28/06 | (2009.01) |
| H04L 29/06 | (2006.01) |
| H04W 4/00 | (2009.01) |
| H04W 80/04 | (2009.01) |

(52) U.S. Cl.
CPC .......... *H04L 69/04* (2013.01); *H04W 4/005* (2013.01); *H04W 28/06* (2013.01); *H04W 80/04* (2013.01)

(58) Field of Classification Search
None
See application file for complete search history.

(56) References Cited

U.S. PATENT DOCUMENTS

| 7,333,473 B1* | 2/2008 | Hurtta | H04W 76/04 370/352 |
| 7,420,951 B1* | 9/2008 | Mizell | H04W 92/14 370/338 |
| 8,406,180 B2* | 3/2013 | Park | H04W 74/0866 370/329 |
| 2001/0033563 A1* | 10/2001 | Niemela | H04L 12/4633 370/349 |

(Continued)

FOREIGN PATENT DOCUMENTS

| EP | 1 725 007 A1 | 11/2006 |
| GB | 2 402 027 A | 11/2004 |

(Continued)

OTHER PUBLICATIONS

"3 rd Generation Partnership Project; Technical Specification Group Services and System Aspects; System Improvements for Machine-Type Communications; (Release 10)", 3GPP Standard; 3GPP TR 23.888, 3rd Generation Partnership Project (3GPP), Mobile Competence Centre ; 650, Route Des Lucioles ; F-06921 Sophia-Antipolis Cedex; France, No. V0.3.2, Mar. 22, 2010 (Mar. 22, 2010), XP050401986.

*Primary Examiner* — Faruk Hamza
*Assistant Examiner* — Thinh Tran (57) ABSTRACT

Methods and techniques for reducing both signaling and data traffic related to machine-type communication devices (MTC) in a GPRS communication network are disclosed. Optimized MTC messages from an MTC device are transmitted using Single-Block Packet Access procedures and restored by SGSNs based on a PDP context established during the mobile station's GPRS attach procedure.

2 Claims, 8 Drawing Sheets

(56) References Cited

U.S. PATENT DOCUMENTS

| | | | |
|---|---|---|---|
| 2002/0064164 A1* | 5/2002 | Barany | H04L 29/06 370/401 |
| 2003/0142643 A1* | 7/2003 | Yang | H04W 28/06 370/328 |
| 2004/0148425 A1* | 7/2004 | Haumont | H04L 29/06027 709/236 |
| 2004/0266438 A1* | 12/2004 | Bjelland | H04W 36/0066 455/437 |
| 2006/0104278 A1* | 5/2006 | Chang et al. | 370/392 |
| 2006/0165027 A1* | 7/2006 | Heden | H04L 12/5695 370/328 |
| 2006/0262736 A1 | 11/2006 | Dong et al. | |
| 2009/0109924 A1* | 4/2009 | Sato | 370/331 |
| 2009/0262681 A1 | 10/2009 | Park et al. | |
| 2010/0278196 A1* | 11/2010 | Kapoor et al. | 370/477 |
| 2012/0100843 A1* | 4/2012 | Wu | H04W 48/18 455/418 |

FOREIGN PATENT DOCUMENTS

| TW | I317587 B | 11/2009 |
|---|---|---|
| WO | WO 2006/048492 A1 | 5/2006 |
| WO | WO 2007/112140 A2 | 10/2007 |

\* cited by examiner

REDUCING PROTOCOL OVERHEAD IN SINGLE-BLOCK PACKET ACCESS PROCEDURES

RELATED APPLICATION

This application claims priority from U.S. Provisional Patent Application No. 61/332,991, filed on 10 May 2010, the entire contents of which are incorporated herein by reference.

FIELD OF TECHNOLOGY

The present application relates to machine-type communication devices and in particular to handling machine-type communication messages traversing a wireless network.

BACKGROUND

Figure 1:
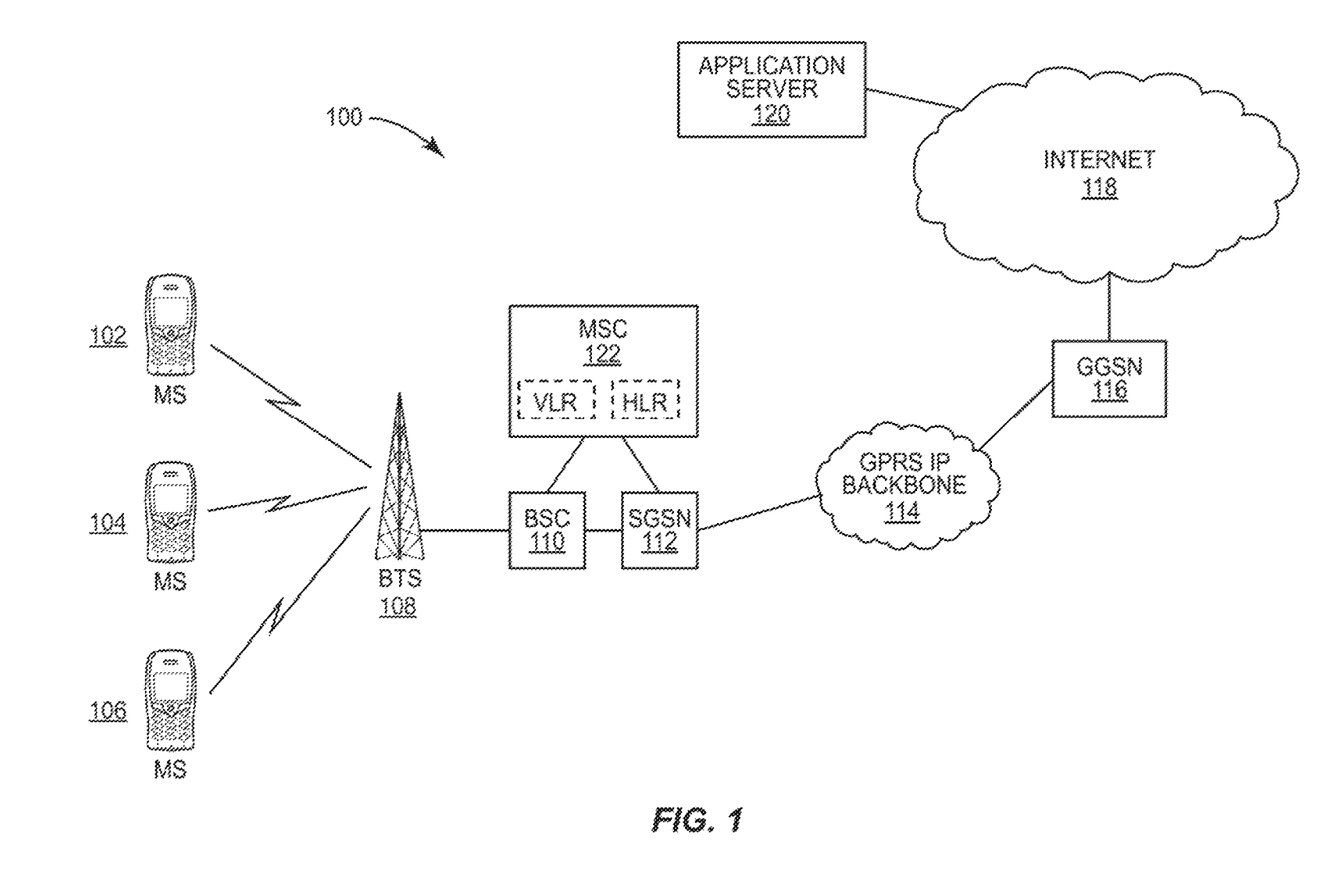
FIG. 1 illustrates a schematic block diagram of a wireless communication network that services MTC devices.

General Packet Radio Service (GPRS) is a set of standards designed for supporting data services on top of a GSM network. GPRS offers transparent IP services to the underlying GSM network and allows GSM networks to interface with the Internet. FIG. 1 illustrates a typical GPRS communication network 100. The GPRS communication network 100 includes GSM network nodes such as a Base Transceiver Station (BTS) 108, a Base Station Controller (BSC) 110, and a Mobile Switching Center (MSC) 122, which form the GSM core network. The GPRS communication system network also includes a Serving GPRS Support Node (SGSN) 112 connected to a Gateway GPRS Support Node (GGSN) 116 via a GPRS IP Backbone 114; these components form the GPRS core network. The GPRS network 100 provides packet data services to mobile stations 102, 104, and 106 and allows them to access data services provided by an application server 120 across the Internet 118.

When the mobile station 102, 104, or 106 powers up, it initiates GSM registration and location update procedures with a MSC/VLR 122, and GPRS registration and routing area update procedures with a Serving GPRS Support Node (SGSN) 112. These two registration processes can be combined and may be referred to as "attach." Once attached, a mobile station carries out its location updates with the MSC/VLR 122 and its routing area updates with the SGSN 112. During the GPRS registration (GPRS attach), the mobile station 102, 104, or 106 initiates a GPRS Attach Request to be sent to the SGSN 112. The SGSN 112 authenticates the identity of the mobile station with the MSC 122, receives from the MSC 122 the authorization of services for the mobile station, and assigns a Packet Temporary Mobile Subscriber Identity (P-TMSI) to the mobile station.

When the mobile station 102, 104, or 106 attempts voice transmission, an end-to-end circuit switch connection needs to be established. When the mobile station 102, 104, or 106 attempts data transmission, no end-to-end connection is needed, but instead a Packet Data Protocol (PDP) context must first be created to allow the network to identify the operational parameters associated with data transmissions made between the mobile station and the SGSN/GGSN. A PDP context includes parameters such as a requested QoS for this particular PDP context and certain protocol configuration options. Establishment of a PDP context is handled by messaging between the mobile stations 102, 104, or 106, the SGSN 112, and the SGSN 112/GGSN 116. PDP context activation may be initiated by a mobile station, a GGSN or an SGSN, and usually involves a series of messages transmitted between the mobile station, the SGSN, and the GGSN. For example, when PDP context establishment is initiated by the mobile station 102, the mobile station 102 sends an Activate PDP Context Request message to the SGSN 112. The PDP Context Activation Request message includes a requested PDP address of the mobile station, an Access Point Name (APN), a requested NSAPI (Network Service Access Point Identifier), a requested QoS, etc. After receiving the Activate PDP Context Request message, the SGSN 112 then derives the address of the intended GGSN from the APN included in the Activation Request and sends a Create PDP Context Request message to the intended GGSN, for example, the GGSN 116. The Create PDP Context Request message includes a Tunnel Endpoint Identifier (TEID), the APN, and the requested PDP address, etc. In response, the GGSN 116 may send to the SGSN 112 a Create PDP Context Response message that includes the results of the PDP context creation. Upon receiving the PDP Context Response message from the GGSN 116, the SGSN 112 sends an Activate PDP Context Accept message to the mobile station. The Activate PDP Context Accept message may include the negotiated PDP address assigned for the mobile station, a PFI (Packet Flow Identifier) value associated with the PDP Context and an LLC SAPI (Service Access Point Identifier at the LLC layer) value. LLC SAPI identifies an access point at the LLC layer that can be used for GPRS data services.

Mobile stations often run machine-type communication (MTC) applications and are referred to as MTC devices herein. The acronym 'MTC' is used to refer broadly to any type of machine-type communication. Examples of MTC devices include smart meters, surveillance cameras, health monitoring devices, etc. An MTC device usually runs an MTC application and engages in machine to machine communications over a GPRS communication network with an MTC serve located on the Internet. Machine to machine communications involve no or very limited human interaction. The communication network can be based on, for example, xDSL (digital subscriber line), LTE (3GPP Long Term Evolution), LTE advanced, WiMAX (worldwide interoperability for microwave access), WLAN (wireless local area network), etc.

Because of the increasing number of MTC devices and the automated nature of MTC applications, MTC traffic is expected to place a large capacity demand on wireless communication networks, which are designed primarily for human-to-human communications. For example, for PDP context activation, at least four signaling messages (Activate PDP Context Request, Create PDP Context Request, PDP Context Response, and PDP Context Accept) are transmitted if the activation is initiated by a mobile station. More messages are involved if the activation is initiated by a GGSN or an SGSN. In a scenario in which all MTC devices located within one GPRS communication network simultaneously re-connect to the network, say, after a power outage, the communication system may be overwhelmed by the sheer number of PDP Context activation related signaling messages.

In another example, it is expected that a significant number of MTC devices will commonly transmit short MTC messages consisting of 10 or less octets of information. GPRS standards define a Single-block Packet Access procedure that does not involve the establishment of an uplink Temporary Block Flow (TBF). A TBF link is a connection at the physical layer between a mobile station and a Base Station System that is allocated temporarily for data transmission. Single-block Packet Access procedures are used by a mobile station for sending Packet Measurement Report messages. Before transmitting a measurement report message, a mobile station first sends a Packet Channel Request message on the Radio Access Channel to the BSS to request a single-block packet access without the establishment of an uplink TBF. Upon receiving the Channel Request message from the mobile station, the BSS assigns a single radio block to the mobile station and sends an Immediate Assignment message to the mobile station on the Access Grant Channel. The Immediate Assignment message contains a packet uplink resource description that includes power control parameter settings and a starting time for the first frame number of the single block. After receiving the Immediate Assignment message, the mobile station sends a Packet Measurement Report message at the start time of the assigned radio block on the Packet Data Channel. In a Single-Block Packet Access procedure, no acknowledgement by the BSS is provided and therefore no ACK/NACK messages are involved.

However, attempting to use Single-Block Packet Access procedures for MTC message transmissions requires that an MTC message together with the overhead associated with the different protocol layers in the air interface protocol stack, for example, UDP/IP/SNDCP/LLC, fit within one single radio block (22 octets if CS-1 coding is used). But the headers from the transport and network layers of the protocol stack add considerable overhead. For example, the headers for UDP/IP layers alone add 46 to 48 octets of overhead to every MTC message.

In Release 10 of its standards for Universal Mobile Telecommunications Systems (UMTS), 3GPP ($3^{rd}$ Generation Partnership Project) is in the process of establishing requirements for 3GPP network system improvements that support MTC. The objective of this study is to identify 3GPP network enhancements required to support a large number of MTC devices in the network and to provide necessary network enablers for MTC communication services. Specifically, transport services for MTC as provided by the 3GPP system and the related optimizations are under consideration as well as aspects needed to ensure that MTC devices, MTC servers and MTC applications do not cause network congestion or system overload. However, current mobile networks remain optimally designed for human-to-human communications and are thus less optimal for MTC applications. Also, MTC bandwidth demand (e.g. for PDP Context activation related signaling) is expected to increase significantly as the number of MTC devices serviced by a network increases. MTC devices exert payload demands in both signaling plane and transmission plane. Methods and techniques related to MTC traffic reduction in both the signaling (control) plane and data transmission (user) plane are needed to reduce system overload and improve network efficiency.

SUMMARY

Protocol stack optimizations are provided for MTC devices to reduce the total volume of user plane payload sent when an MTC message requires transmission. Signaling optimizations are provided for MTC devices to reduce or even eliminate some of the end-to-end signaling procedures such as MTC device-to-SGSN NAS (non-access stratum) signaling typically required for legacy mobile devices. Such optimizations can also include using optimized single-block packet access procedures for transmitting MTC messages. The number of protocol layers required in the protocol stack can be reduced and therefore the bandwidth needed can be reduced as well when MTC application layer messages are transmitted to or from an MTC device over the air interface.

According to one embodiment of protocol stack optimization for data communications between an MTC device and an SGSN in a GPRS communication network, the MTC device constructs an optimized message for delivery to a target application at an MTC application server located on the Internet. The optimized message does not include an IP header or a UDP header. The MTC device sets a pre-specified value in a pre-specified data field in the optimized message to indicate to the SGSN that an IP header and a UDP header must be added to the optimized message before delivery to the target application. In some examples, the pre-specified data field is the Service Access Point Identifier field at the Logical Link Control layer. For some MTC applications that rely on TCP instead of UDP protocol, the optimized message sent by the MTC device does not include an IP header or a TCP header. The pre-specified data field in the optimized message is set to a value that tells the SGSN to add an IP and a TCP header to the optimized message before delivery to the target application.

According to one embodiment of routing an optimized message for data communication between an MTC device and an SGSN communicating through an optimized protocol stack, the SGSN receives a message from the MTC and ascertains that the received message is an optimized message by checking a pre-specified data-field. To forward this optimized message to a GGSN, the SGSN fills the message with a UDP source port number, a UDP destination port number, an IP source address and an IP destination address. In some examples, the User Datagram Port (UDP) port numbers may be stored in a pre-specified data field. In some examples, the IP source address is retrieved by mapping a Packet Temporary Mobile Subscriber Identity (P-TMSI) number associated with the mobile station to a Packet Data Protocol address associated with the mobile station and the IP destination address is retrieved by mapping a Packet Temporary Mobile Subscriber Identity (P-TMSI) number included in the received message to an IP address of the MTC server stored by the SGSN during a PDP Context creation procedure.

In one embodiment of protocol stack optimization for data communication between a mobile station and an SGSN, the method includes constructing an optimized message at the mobile station for delivery to a target application in a target network node via a User Datagram Protocol (UDP) packet relayed using an Internet Protocol (IP) packet. The optimized message uses the Network Service Access Point Identifier field at a Sub-Network Dependent Convergence Protocol layer of the protocol stack to convey UDP port numbers.

In some embodiments of relaying an optimized message by an SGSN for data communication between a mobile station and the SGSN, the SGSN receives a message that does not include a User Datagram Protocol (UDP) header or an Internet Protocol (IP) header due to protocol stack optimization. In some examples, the SGSN retrieves the UDP port number information from a Network Service Access Point Identifier field at a Sub-Network Dependent Convergence Protocol layer of the protocol stack. The SGSN also retrieves an IP destination address and an IP source address using the P-TMSI stored in the message. The SGSN constructs, based on the derived UDP port information and the retrieved IP addresses, an IP header and a UDP header, and adds the IP header and the UDP header to the message. The SGSN then transmits the message to the MTC application server via the GGSN.

Some embodiments are directed to techniques for delivering a message from an SGSN to a mobile station. In some of these embodiments, the SGSN and the mobile station communicate through an optimized protocol stack. The SGSN receives a message from a GGSN that is destined for the mobile station and removes the UDP and IP headers from the received message according to the optimized protocol stack. The SGSN then sets a data field in the message, e.g., a Service Access Point Identifier field at a Logical Link Control layer of the protocol stack, to a pre-specified value to indicate that the message is optimized and transmits the optimized message to the mobile station.

According to some embodiments, a mobile station is configured to communicate with an SGSN through a protocol stack that comprises one or more protocol layers and capable of supporting protocol stack optimization. The mobile station includes a receiving unit for receiving messages from an application layer in the wireless network node, a transmitting unit for transmitting messages over the radio interface and a processing unit for processing messages received from the receiving unit. In some examples, the processing unit of the mobile station may be configured to construct an optimized message for delivery to a target application in a target network node and transmit the optimized message to the SGSN. In some examples, the optimized message does not include a UDP header or an IP header but includes a pre-specified data field that is set to a value to indicate to the SGSN that a UDP and an IP header must be added to the optimized message before delivery to the target application.

According to some embodiments, a mobile station is configured to communicate with an SGSN through a protocol stack that comprises one or more protocol layers. The mobile station is capable of supporting protocol stack optimization. The mobile station includes a receiving unit for receiving messages on the radio interface, a transmitting unit for transmitting received messages to the application layer in the wireless network node, and a processing unit for processing messages received from the receiving unit and preparing messages to be transmitted by the transmitting unit. In some examples, the processing unit of the mobile station is configured to receive a message that does not include a User Datagram Protocol (UDP) or an Internet Protocol (IP) header due to protocol stack optimization, and derive User Datagram Protocol (UDP) port number information using a pre-specified data field in the message before delivering the message to the target application based on the derived UDP port number information. In some examples, the pre-specified data field is a Network Service Access Point Identifier field at a Sub-Network dependent Convergence Protocol layer of the protocol stack.

According to some embodiments, an SGSN located in a GPRS communication network may be configured to communicate with a GGSN and may be capable of supporting protocol stack optimization. The SGSN includes an input unit for receiving messages, an output unit for transmitting messages, a processing unit for processing messages received from the input unit and for preparing messages to be transmitted by the output unit. In some examples, the processing unit of the SGSN is configured to receive a message that does not include a UDP header or an IP header due to protocol stack optimization and is configured to derive the UDP port number information using a pre-specified data field in the message and to retrieve an IP destination address and an IP source address using the P-TMSI. In some examples, the processing unit of the SGSN is further configured to construct, based on the extracted UDP port information and the retrieved IP addresses, an IP header and a UDP header, and add the IP and UDP header to the message to form UDP/IP data packet before transmitting the UDP/IP data packet to the target application in a target network node via the GGSN.

Those skilled in the art will recognize additional features and advantages upon reading the following detailed description, and upon viewing the accompanying drawings.

BRIEF DESCRIPTION OF THE FIGURES

In the attached drawings, like reference numerals designate corresponding similar parts. The features of the illustrated embodiments can generally be combined unless they clearly exclude each other. Example embodiments are depicted in the drawings and are detailed in the description that follows.

DETAILED DESCRIPTION

Figure 2:
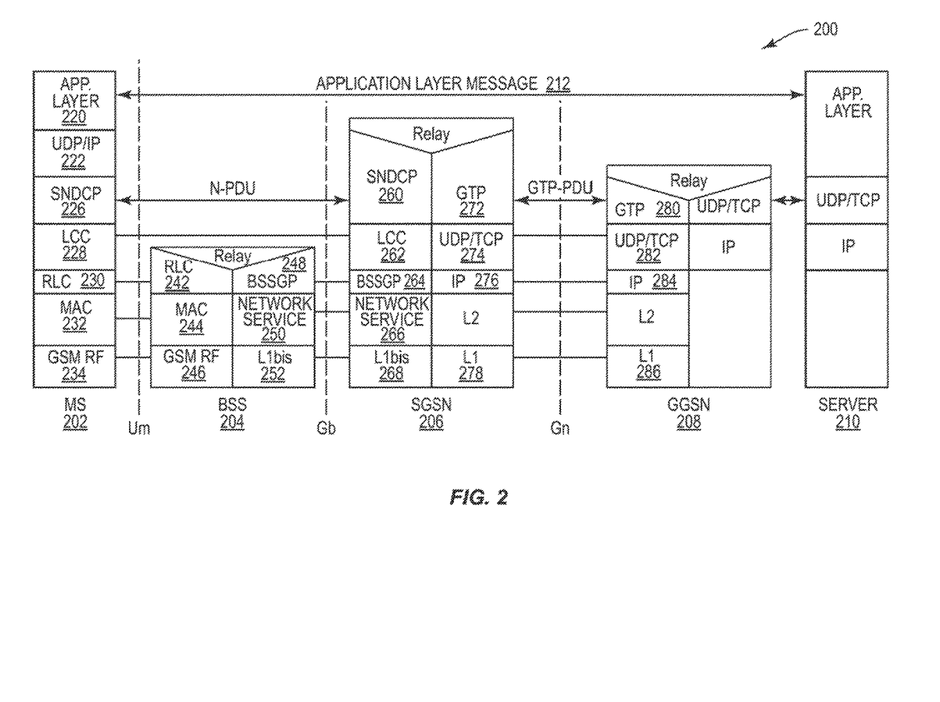
FIG. 2 illustrates the protocol stack layers at various network nodes in a GPRS communication network.

FIG. 2 illustrates protocol stacks implemented at the different network nodes in a standard GPRS communication network. FIG. 2 also illustrates several messages that are sent between these protocol stacks. A protocol stack 202 at a mobile station includes a GSM RF layer 234, a MAC (Medium Access Control) layer 232, a RLC (Radio Link Control) layer 230, a LLC (Logic Link Control) layer 228, a SNDPCP (Sub-Network Dependent Control Protocol) layer 226, a UDP/IP layer, and an application layer 220. In protocol stack 202, application layer 220 is on top of a transport layer, the UDP layer 222, and a network layer, the IP layer 224. In this particular example, the application layer 220 is a UDP/IP type of application. In other examples, the application layer 220 may be a TCP/IP type of application or some other IP related applications. The SNDPCP layer 226 of the protocol stack 202 understands packet protocols, such as TCP/IP, X.25, etc. and is employed to encapsulate the upper packet layers from the underlying GPRS access layers and connect the upper layer packet protocols with the underlying GPRS access protocol layers.

In protocol stack 202, LLC layer 228 provides a logic layer connection between the mobile station and the SGSN. RLC layer 230 maintains reliable radio link between the mobile station and the BSS. MAC layer 232 is responsible for accessing BSS radio resources by the mobile station.

GSM RF layer 234 is a physical layer and handles radio transmissions occurring in the physical GSM channels and packet channels, such as Radio Access Channel and Packet Radio Access Channel, etc.

The protocol stack 204 implemented in a BSS includes a RLC layer 242, a MAC layer 244 and a GSM RF layer 246 that communicate with mobile stations on the Um interface side. On the side of the Gb interface between the BSS and a SGSN, protocol stack 204 includes a BSSGP layer 248, a network service layer 250, and a L1 Bis layer 252 that communicate with an SGSN. The BSS and SGSN are connected over a Frame Relay network.

On the protocol stack 206 implemented on the SGSN, the Gb interface side of the protocol stack 206 includes a BSSGP layer 264, a Network Service layer 266 and a L1 Bis layer 268 that communicate with the BSS, and a LLC layer 262 and an SNDCP layer 260 that communicate with the mobile station above the Frame Relay layer of the BSS. The Gn interface side of the protocol stack 206 on the SGSN includes a GTP-U layer 272, a TCP/UDP layer 274, an IP layer 276, and an L2/L1 layer 278. The SGSN communicates with a GGSN over the Gn interface.

On the protocol stack 208 implemented on the GGSN, the Gn interface side of the protocol stack includes a GTP-U layer 280, a TCP/UDP layer 282, an IP layer 284, and an L2/L1 layer 286. The GGSN interfaces with a packet data network and communicates with data application servers through TCP/UDP/IP protocols, as employed by the protocol stack 210 implemented on an MTC server. To a mobile station, a GGSN is an entry point into the packet data network with which the GGSN interfaces.

When the mobile station in FIG. 1 supports an MTC application at application layer 220, the mobile station is referred to as an MTC device in the present application. The number of MTC devices and the MTC related traffic have been increasing steadily over the years. Various methods and techniques can be employed to reduce MTC related traffic in both the control plane and the user plane, especially for communications over the air interface between mobile stations and BSS.

According to the techniques described herein, PDP context activation procedures can be eliminated for MTC devices, to reduce traffic load in the control plane. As described earlier, in a standard GPRS communication network, a PDP context associated with a mobile station specifies a PDP address, i.e., an IP address for the mobile station, an Access Point Name, i.e., a reference to the GGSN the mobile station is using for packet data network access in this particular PDP context, and a requested QoS. In GPRS standards, a mobile station can activate PDP context activation procedures for multiple applications and can be associated with more than one PDP context.

Eliminating PDP context activation procedures for MTC devices reduces signaling loads in the network. However, the information normally specified in a PDP context is still needed for data transmissions by an MTC device. For example, the APN specified in a PDP context is needed for an SGSN to identify the GGSN for the MTC device. The requested QoS is needed for a BSS to apply the QoS to the radio channels. The PDP address is needed by a GGSN to identify the MTC device. One solution is for an SGSN to perform a one-time PDP context activation procedure immediately following a successful GPRS Attach or just before sending an Attach Accept message to the MTC device.

For an SGSN to trigger a PDP context activation procedure, the SGSN needs to receive from the MTC device an APN of its preferred GGSN and the address of the MTC server the MTC device intends to communicate with. These two pieces of information can be included in the Attach Request message sent by the MTC device to the SGSN. Alternatively, the SGSN can retrieve either of these two pieces of information from the Home Location Register (HLR) during the attachment procedure. The SGSN then maps the APN into an IP address of the GGSN and maps the address of the MTC server into an IP address of the MTC server. The SGSN stores the IP address of the MTC server and associates it with the MTC device, which may be represented by a P-TMSI. The SGSN then triggers a Create PDP Context procedure with the GGSN by sending a Create PDP Context Request to the GGSN. In the Create PDP Context Request, the SGSN includes an indication that the corresponding mobile station is a MTC device and therefore only one PDP context will be needed for this MTC device. During the PDP Context creation, the GGSN assigns a PDP address (IP address for the mobile station) to the mobile station and transmits the PDP address back to the SGSN via the Create PDP Context Response or as part of in-band signaling within the transmission plane.

After the SGSN receives the PDP address created for the MTC device by the GGSN during the PDP context creation, the SGSN associates the PDP address of the MTC device with the APN contained in the Attach Request message sent from the MTC device, thus creates a PDP address/APN pair for use in relaying MTC messages.

After the completion of the Attach procedure and the Create PDP Context procedure, an MTC device can send and receive MTC messages without further requesting PDP context activation.

In a GPRS communication network, a mobile station can transmit packet data to a BSS using one of the following three procedures: multi-block one-phase access, multi-block two-phase access or single-block packet access. Signaling in a single-block packet access procedure involves three messages: an EGPRS Packet Channel Request message on the Radio Access Channel sent by the mobile station to the BSS, an Immediate Assignment message on the Access Grant Channel sent by the BSS to the mobile station, and the MTC message sent on the Packet Data channel by the mobile station. In contrast, signaling in a multi-block one-phase access procedure or a multi-block two-phase access procedure requires establishment of a temporary flow block (TBF). Besides the three signaling messages involved in the single-block packet access mode, both multi-block access procedures also require a Packet resource Request message on the Packet Data Channel, a Packet Uplink Assignment message on the Packet Access Control Channel, and multiple ACK/NACK messages. In comparison, single-block packet access procedures minimize signaling traffic over the air interface between the MTC device and the BSS, and would be a viable option for MTC message transmission.

In single-block packet access procedures, the size of an assigned single radio block is 22 octets. It is expected that a significant number of MTC devices will commonly transmit short MTC messages consisting of 10 or less octets of information. However, in the standard GPRS framework, an MTC application runs on top of TCP/UDP/IP protocol layers and incurs significant overhead. For example, the UDP/IP layers alone generate 46 to 48 octets of overhead for every MTC message. This is because the UDP/IP layers include an eight octet IPv6 header, a sixteen octet IPv6 source address, a sixteen octet IPv6 destination address, and an eight octet UDP header.

Figure 3:
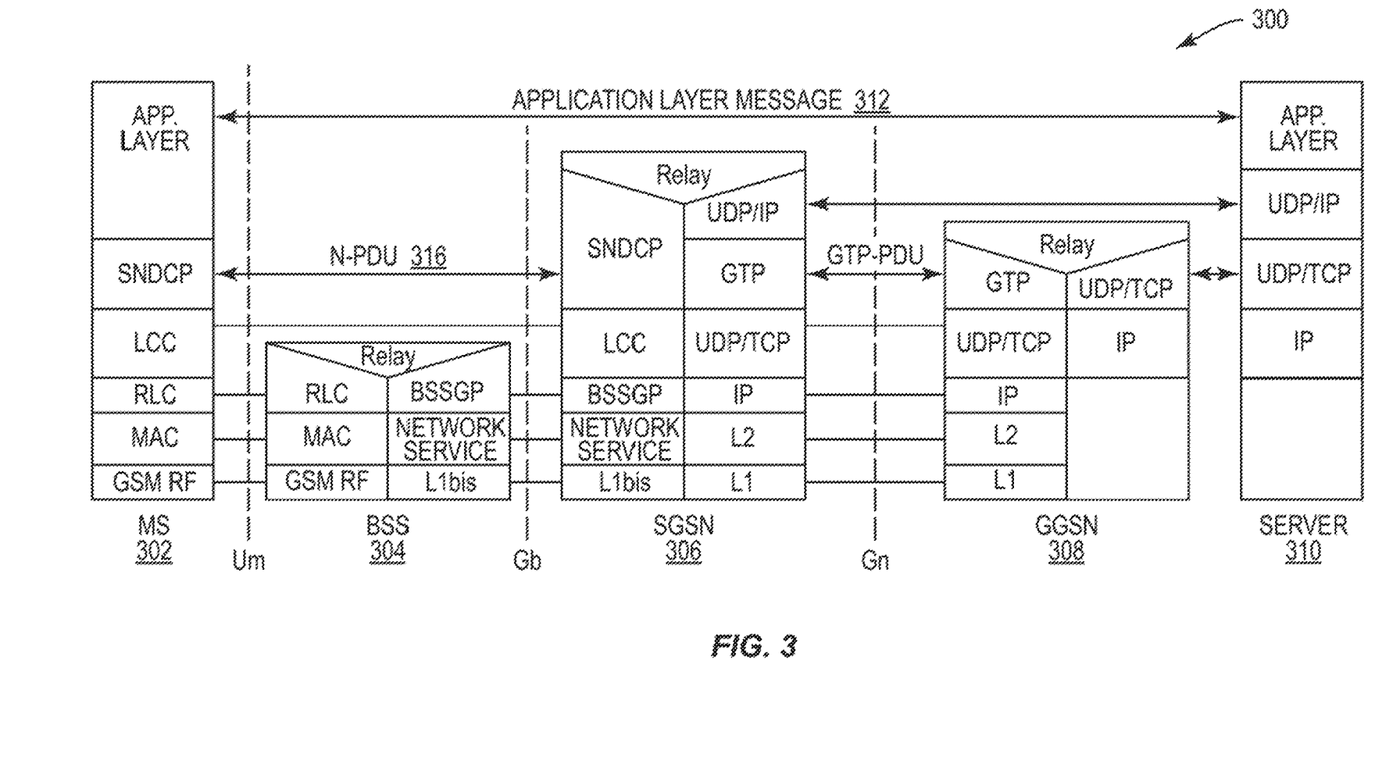
FIG. 3 illustrates protocol stack optimization in which application layer messages are routed across a wireless communication network.

Protocol stack optimizations can be utilized to minimize the protocol overhead when sending MTC messages over the air interface. In some embodiments of protocol stack optimization, the UDP/IP layers are removed from the UDP/IP/SNDCP/IP protocol stack. In some embodiments, other transport layers that are related to the IP protocol, such as TCP, are removed along with the IP layer from the protocol stack. FIG. 3 illustrates one embodiment of protocol stack optimization. In FIG. 3, at the mobile station, the UDP/IP layers are removed from the UDP/IP/SNDCP/IP protocol stack that is associated with the radio interface (Um) between the mobile station and the BSS. Between the MTC device and the SGSN, an application layer message 312 is transmitted using the optimized protocol stack and is then relayed from the SGSN to MTC server via the GGSN without optimization (i.e. with the UDP/IP layers present).

With such optimization a short MTC message, such as the application layer message 312, can be passed directly from the MTC application to SNDCP at the BSS as an N-PDU 316 with no UDP/IP packets included the N-PDU, using the single-block packet access procedure.

When the system and the MTC device both support protocol stack optimization, the MTC device can send an EGPRS Packet Channel Request with an optimized single-block packet access indication, whenever the MTC device needs to send a short MTC message using the optimized protocol stack.

To a BSS, the reception of an EGPRS Packet Channel Request indicating the use of optimized single-block packet access indicates that the MTC message (N-PDU) to be sent using the single radio block will be carried within the context of the optimized protocol stack (i.e., the MTC message/SNDCP/LLC/RLC stack). The BSS can grant the request by sending an Immediate Assignment message to the MTC device with the assigned single radio block. The MTC device then sends the MTC message as an N-PDU 316 via the LLC layer. In some embodiments, the N-PDU 316 includes an indication that the LLC PDU payload consists of an SN-PDU carrying a complete MTC message. The N-PDU 316 can also include an indication that the optimized protocol stack has been used. The indication may be provided by defining a currently reserved SAPI value (e.g., SAPI=1000).

Figure 4:
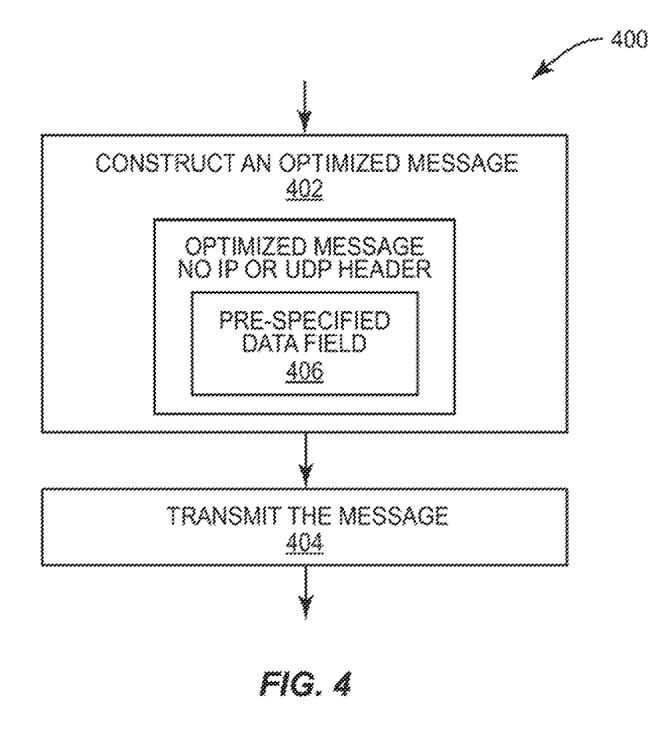
FIG. 4 illustrates a flow diagram of transmitting an optimized application layer message in a wireless communication network.

FIG. 4 illustrates a flow chart of an MTC device sending a short MTC message using the optimized protocol stack. In Step 402, at the application layer, the MTC device constructs an optimized message that has no IP or UDP header. The message also contains a pre-specified data field 406 to indicate that the message is an optimized message. In Step 404, the MTC device transmits the optimized message over the radio interface to the corresponding BSS.

When the BSS receives the LLC N-PDU 316 sent on the assigned single radio block over the Packet Data Channel, it relays the N-PDU 316 to the SGSN. In some embodiments, the BSS may include in the N-PDU 316 an indication that the optimized protocol stack is used. The indication may be provided by either defining a currently reserved SAPI value (e.g., SAPI=1100) or enhancing the BSSGP protocol to indicate when the optimized protocol stack is used, e.g., by modifying an existing information element.

Figure 5:
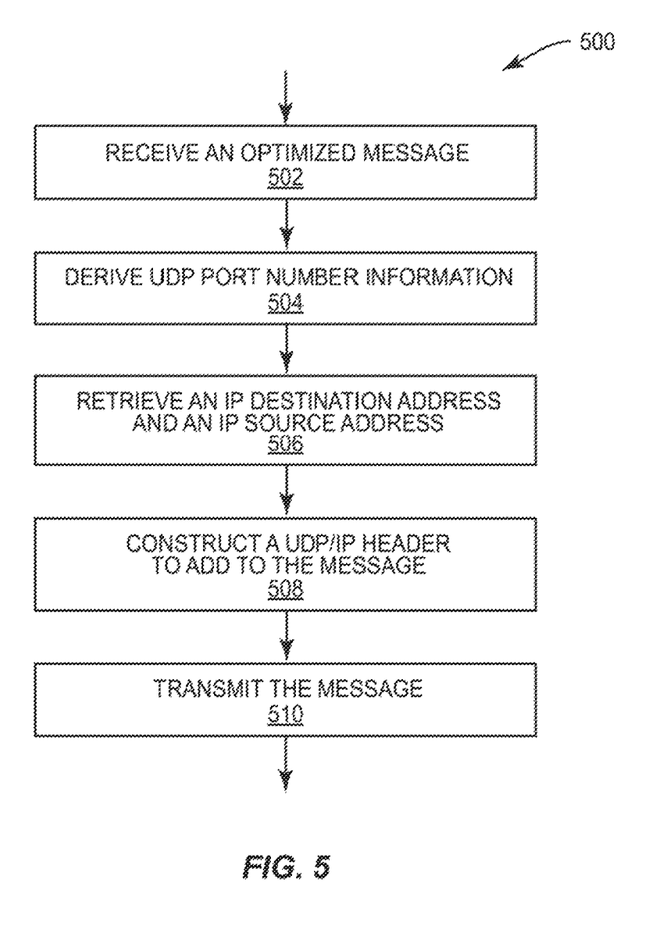
FIG. 5 illustrates a flow diagram of routing an optimized application layer message in a wireless communication network.

Upon receiving an SN-PDU, the SGSN checks whether the message is sent using the optimized protocol stack by checking the SAPI value. If the message is sent using the optimized protocol stack, the SGSN serves as a proxy by inserting the required UDP/IP packets before forwarding the MTC message to the GGSN. FIG. 5 illustrates an exemplary flow chart of an SGSN processing an optimized application layer message. In Step 502 of FIG. 5, the SGSN decides that it has received an optimized message and needs to insert an UDP header and an IP header into the message.

To build the UDP header for the MTC message, the SGSN needs to derive a source Port number and a destination Port number (Step 504). In some implementations, eleven UDP port values can be allocated for MTC application purposes. The NSAPI field in the SNDCP layer can be used to convey UDP port information. For example, whenever an MTC message is sent using the optimized protocol stack by the mobile station, values of the NSAPI field in the 5-15 range can be dynamically configured and can be mapped to any pair of eleven corresponding UDP port values allocated for MTC applications. Alternatively, the source Port number and destination Port number can be conveyed to the SGSN as part of new information sent from mobile station to the SGSN when the mobile station triggers the attach procedure. This is possible for the case where the mobile station supports only a single MTC application which always communicates with the same MTC application on the MTC server.

To build the IP header for the MTC message, SGSN needs to derive an IP source address and an IP destination address (Step 506). For the IP source address, the SGSN maps the P-TMSI assigned to the mobile station during GPRS attach into the PDP address that is assigned to the mobile station during the PDP context creation initiated by the SGSN during the attach procedure. For the IP destination address, the SGSN uses the stored IP address of the MTC server associated with the MTC device. The IP address of the MTC server is obtained by the SGSN as part of new information sent from mobile station to the SGSN when the mobile station triggers the attach procedure.

The SGSN adds the newly built IP header and UDP header to the SN-PDU it receives from the BSS to build a new N-PDU (Step 508). The SGSN also retrieves the TEID established for the MTC device obtained during the Create PDP Context procedure and generates a GTP-U PDU for carrying the new N-PDU. The GTP-U PDU is then forwarded to the corresponding GGSN (Step 510). The GGSN then forwards the received GTP-U PDU as any regular GTP-U PDU to the MTC server based on the IP destination address of the MTC server.

Figure 6:
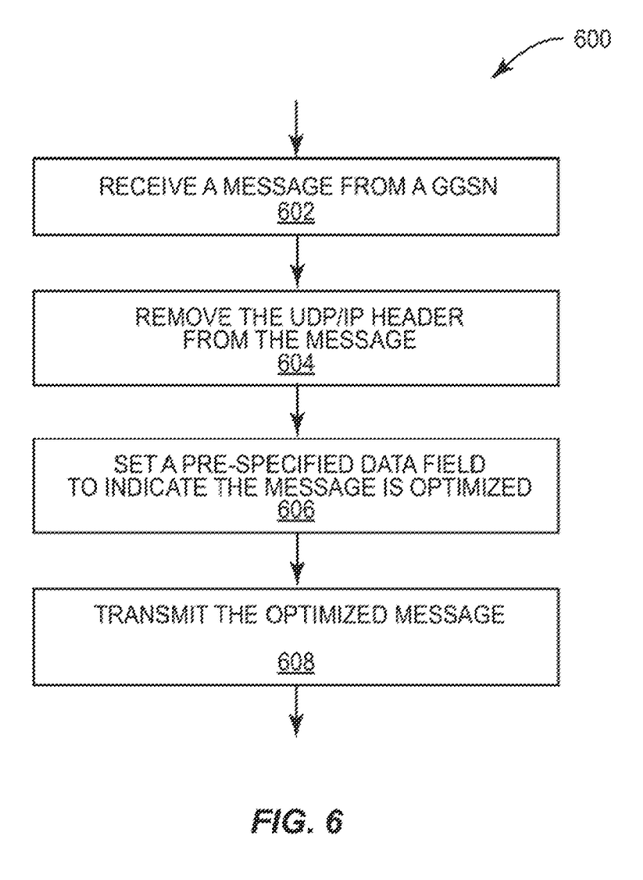
FIG. 6 illustrates a flow diagram of routing an application layer message in a wireless communication network that supports optimized protocol stacks.

For downlink MTC messages, an SGSN can serve as a proxy for terminating the UDP/IP layers by deciding to reduce the size of an N-PDU received from the GGSN by removing the UDP/IP layers. FIG. 6 illustrates one such embodiment. When the SGSN receives a GTP-U PDU from the GGSN (Step 602), it uses legacy procedures to identify the corresponding target mobile station and determines that the target mobile station is an MTC device. If the MTC device supports the optimized protocol stack, the SGSN can then optionally decide to reduce the size of an N-PDU carried within the GTP-U PDU by removing the UDP/IP layers such that the new N-PDU now consists of an MTC message (Step 604). The NSAPI within the SN-PDU header can be used again to convey UDP port number information that is extracted from the UDP header. The SGSN then sets a pre-specified data field, such as field SAPI in the LLC header, to indicate that the new PDU is optimized (Step 606) and then transmits the new PDU via a BSSGP PDU over the Gb interface towards the BSS.

The BSSGP PDU containing the new N-PDU is sent to the BSS along with an indication that the optimized protocol stack is used. The BSS proceeds to establish a downlink TBF and delivers the new N-PDU to the MTC device.

When the MTC device receives an MTC message, if the MTC device supports the optimized protocol stack, it checks whether the MTC message is sent using the optimized protocol stack. This indication may be provided by defining a currently reserved SAPI value (e.g., SAPI=1100) to indicate when the LLC PDU payload consists of an SN-PDU carrying a complete MTC message the same way as in uplink transmission. Alternatively, downlink TBF establishment procedures may be enhanced to indicate the optimized protocol stack will be used, e.g., by modifying an existing information element in a TBF assignment message.

Figure 7:
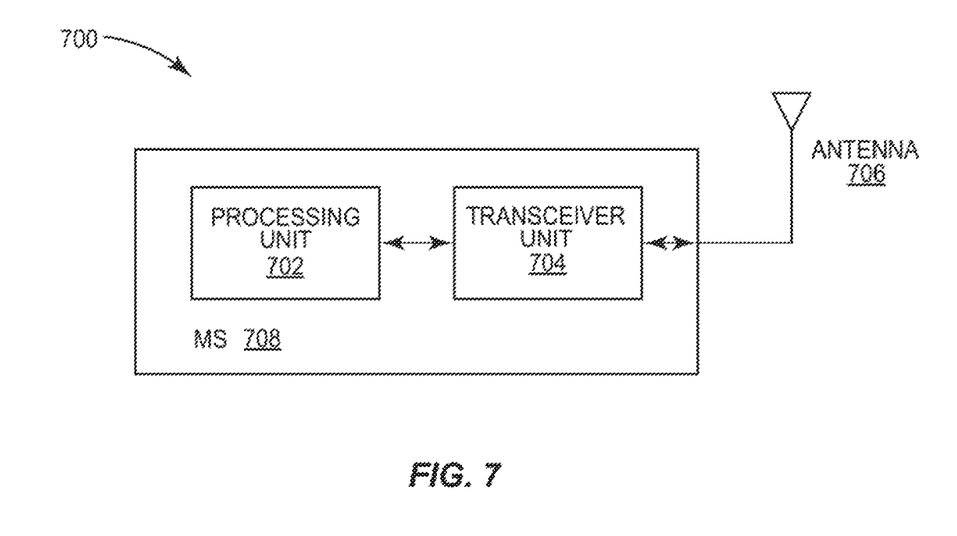
FIG. 7 illustrates a block diagram of an exemplary mobile station.
Figure 8:
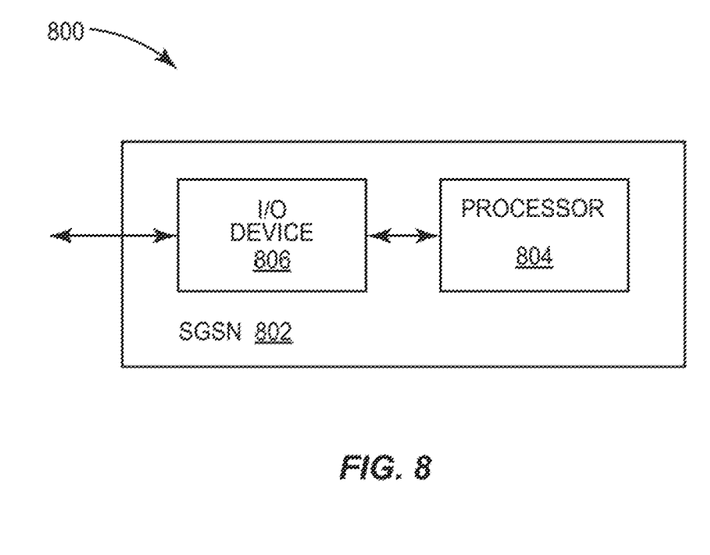
FIG. 8 illustrates a block diagram of an exemplary SGSN.

Those skilled in the art will appreciate that the various functions of the aforementioned mobile station, BSS, SGSN, and GGSN may be performed using various combinations of hardware and software. FIGS. 7 and 8 illustrate an exemplary embodiment of a mobile station and an SGSN respectively. In FIG. 7, a mobile station 708 is shown to include a processing unit 702 for data processing and a transceiver unit 704 of transmitting and receiving wireless data to and from BSSs over the air interface. In FIG. 8, an SGSN 802 is shown to include a processor 804 an Input/Output unit 802. The processing unit 702 and the processor 804 may correspond to one or more commercially available or custom microprocessors, microcontrollers, or digital signal processors. Optionally, both mobile station 708 and SGSN 802 may include memory devices containing the software, firmware, and data used to implement the functionalities described above. These memory devices may include, but are not limited to, the following types of devices: cache, ROM, PROM, EPROM, EEPROM, flash, SRAM, and DRAM.

What is claimed is:

1. A wireless machine-type communication (MTC) device configured to communicate with a Serving GPRS Support Node (SGSN) through a protocol stack that comprises one or more protocol layers and capable of supporting protocol stack optimization, the wireless MTC device comprising:
   a receiving unit for receiving MTC messages on the radio interface;
   a transmitting unit for transmitting received MTC messages to an application layer in the wireless MTC device; and
   a processing unit for processing MTC messages received from the receiving unit and preparing MTC messages to be transmitted by the transmitting unit, said processing unit configured to:
      receive a MTC message, wherein the MTC message does not include a User Datagram Protocol (UDP) or an Internet Protocol (IP) header due to protocol stack optimization;
      derive UDP port number information using a pre-specified data field in the received MTC message; and
      deliver the MTC message to the application layer based on the derived UDP port number information, where the MTC device has a protocol stack without UDP/IP layers.

2. The wireless MTC device of claim 1, wherein the wireless MTC device and the SGSN are located in a GPRS network and the pre-specified data field is a Network Service Access Point Identifier field at a Sub-Network Dependent Convergence Protocol layer of the protocol stack.

* * * * *